United States Patent
Cordeiro et al.

(10) Patent No.: US 9,876,545 B2
(45) Date of Patent: Jan. 23, 2018

(54) APPARATUS, SYSTEM AND METHOD OF WIRELESS COMMUNICATION VIA POLARIZED ANTENNAS

(71) Applicant: INTEL IP CORPORATION, Santa Clara, CA (US)

(72) Inventors: Carlos Cordeiro, Portland, OR (US); Alexander Maltsev, Nizhny Novgorod (RU); Ali S. Sadri, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 128 days.

(21) Appl. No.: 14/816,017

(22) Filed: Aug. 2, 2015

(65) Prior Publication Data
US 2017/0033848 A1 Feb. 2, 2017

(51) Int. Cl.
| | |
|---|---|
| H04W 4/00 | (2009.01) |
| H04B 7/0452 | (2017.01) |
| H04B 7/0404 | (2017.01) |
| H04B 7/06 | (2006.01) |

(52) U.S. Cl.
CPC ......... H04B 7/0452 (2013.01); H04B 7/0404 (2013.01); H04B 7/0684 (2013.01)

(58) Field of Classification Search
CPC . H04W 24/10; H04W 16/28; H04W 72/0453; H04W 16/10; H04W 24/02; H04W 28/18; H04W 52/46; H04W 74/0816; H04W 84/12; H04W 88/08; H04W 8/005; H04L 1/0026; H04L 1/0027; H04L 1/0028; H04B 7/0617
See application file for complete search history.

(56) References Cited

U.S. PATENT DOCUMENTS

| 8,345,716 B1 * | 1/2013 | Ehret ................. H04B 7/10 370/334 |
| 9,350,444 B2 * | 5/2016 | Tarighat Mehrabani ......... H04B 7/2656 |
| 2004/0196834 A1 * | 10/2004 | Ofek ................ H01Q 1/246 370/352 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

Primary Examiner — Michael J Moore, Jr.
(74) Attorney, Agent, or Firm — Alliance IP, LLC

(57) ABSTRACT

Some demonstrative embodiments include apparatuses, devices, systems and methods of wireless communication via polarized antennas. For example, an apparatus may include circuitry configured to cause a wireless station to generate an information element including a plurality of antenna identifiers of a plurality of directional antennas of the wireless station, and a plurality of polarization indicators corresponding to the plurality of antenna identifiers, a polarization indicator corresponding to an antenna identifier to indicate a polarization setting of a directional antenna identified by the antenna identifier; and to transmit a frame including the information element.

21 Claims, 7 Drawing Sheets

(56) References Cited

U.S. PATENT DOCUMENTS

| | | | |
|---|---|---|---|
| 2009/0227260 A1* | 9/2009 | Anreddy | H04B 7/0452 455/450 |
| 2013/0095875 A1* | 4/2013 | Reuven | H04B 7/10 455/509 |
| 2014/0035781 A1* | 2/2014 | Holzheimer | G01S 3/50 342/188 |
| 2014/0106686 A1* | 4/2014 | Higgins | H04B 1/40 455/78 |
| 2014/0177742 A1 | 6/2014 | Maltsev et al. | |
| 2014/0321566 A1* | 10/2014 | Wu | H04B 7/10 375/267 |
| 2015/0095477 A1* | 4/2015 | Jung | H04M 1/72519 709/223 |
| 2015/0214633 A1* | 7/2015 | Pan | H01Q 1/20 342/372 |
| 2016/0329938 A1* | 11/2016 | Jo | H04B 7/0619 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

* cited by examiner

APPARATUS, SYSTEM AND METHOD OF WIRELESS COMMUNICATION VIA POLARIZED ANTENNAS

TECHNICAL FIELD

Embodiments described herein generally relate to apparatus, system and method of wireless communication via polarized antennas.

BACKGROUND

A wireless communication network in a millimeter-wave (mmWave) band may provide high-speed data access for users of wireless communication devices.

Communication over the mmWave may be performed via directional antennas.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
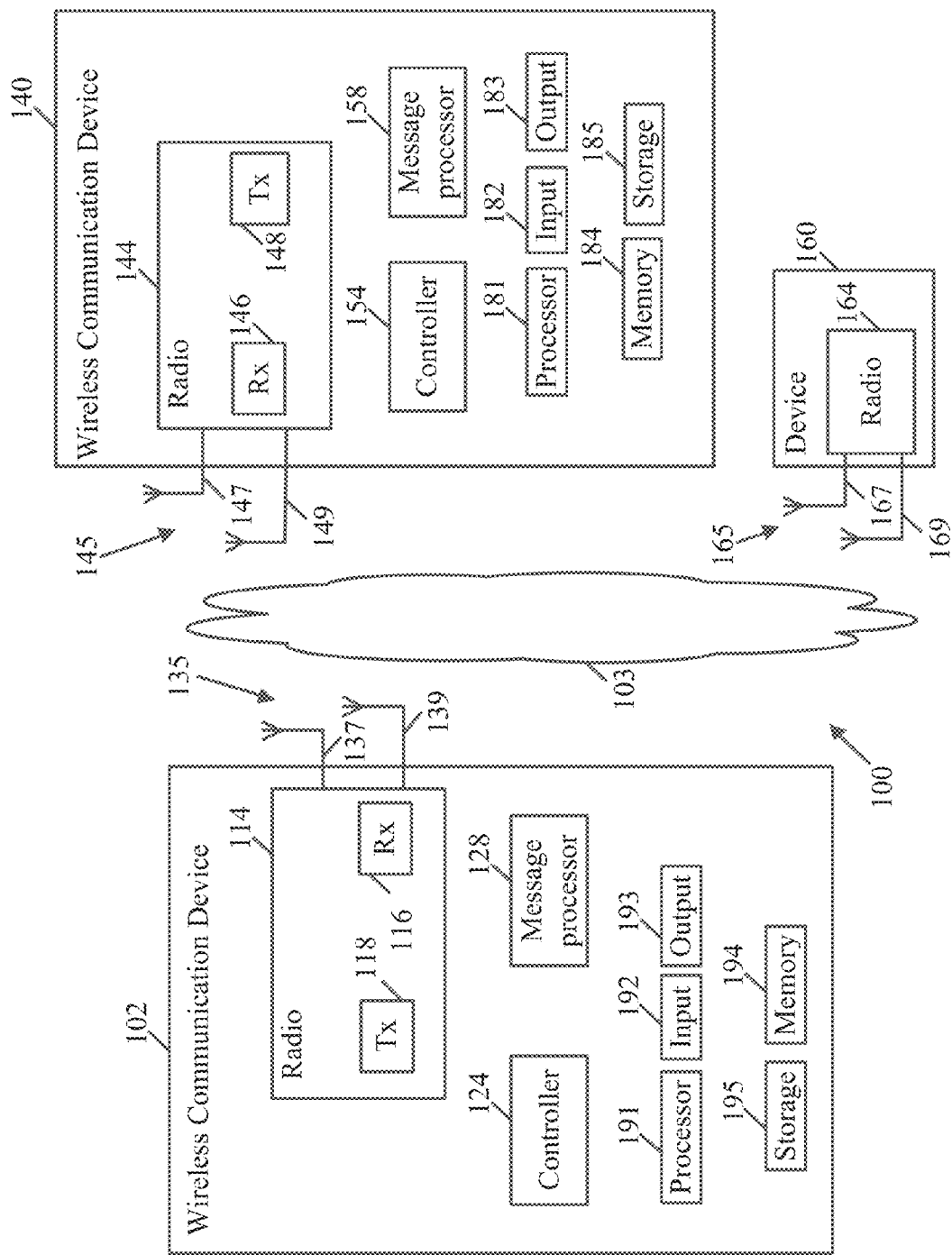
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz*

Band", 28 Dec. 2012); IEEE-802.11REVmc ("*IEEE 802.11-REVmc™/D3.0, June* 2014 *draft standard for Information technology—Telecommunications and information exchange between systems Local and metropolitan area networks Specific requirements; Part* 11: *Wireless LAN Medium Access Control* (*MAC*) *and Physical Layer* (*PHY*) *Specification*"); IEEE802.11-ay (*P802.11ay Standard for Information Technology—Telecommunications and Information Exchange Between Systems Local and Metropolitan Area Networks—Specific Requirements Part* 11: *Wireless LAN Medium Access Control* (*MAC*) *and Physical Layer* (*PHY*) *Specifications—Amendment: Enhanced Throughput for Operation in License-Exempt Bands Above* 45 *GHz*)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (including "*WiFi Peer-to-Peer* (*P2P*) *technical specification, version* 1.5, *Aug.* 4, 2014") and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, shared) or memory/and, (or group, dedicated or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, a wireless communication device 160, and/or one more other devices.

In some demonstrative embodiments, wireless communication devices 102, 140 and/or 160 may include a mobile device or a non-mobile, e.g., a static, device.

For example, wireless communication devices 102, 140 and/or 160 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or devices 160 and/or 140 may include, for example, one or more of a processor 181, an input unit 182, an output unit 183, a memory unit 184, and/or a storage unit 185. Devices 102, 140 and/or 160 may optionally include other suitable hardware components and/or software components. In some demonstrative embodiments, some or all of the components of one or more of devices 102, 140 and/or 160 may be enclosed in a common housing or packaging, and may be interconnected or operably associated using one or more wired or wireless links. In other embodiments, components of one or more of devices 102, 140 and/or 160 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140 and/or 160 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102, 140 and/or 160 may perform the functionality of one or more wireless stations (STA), e.g., as described below.

In some demonstrative embodiments, devices 102, 140 and/or 160 may perform the functionality of one or more DMG stations.

In other embodiments, devices 102, 140 and/or 160 may perform the functionality of any other wireless device and/or station, e.g., a WLAN STA, a WiFi STA, and the like.

In some demonstrative embodiments, devices 102, 140 and/or 160 may include one or more radios including circuitry and/or logic to perform wireless communication between devices 102, 160, 140 and/or one or more other wireless communication devices. For example, device 102 may include a radio 114, device 140 may include a radio 144, and/or device 160 may include a radio 164.

In some demonstrative embodiments, radios 114, 144 and/or 164 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114, 144 and/or 164 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114, 144 and/or 164 may include circuitry, logic, modulation elements, demodulation elements, amplifiers, analog to digital and digital to analog converters, filters, and/or the like. For example, radios 114, 144 and/or 164 may include or may be implemented as part of a wireless Network Interface Card (NIC), and the like.

In some demonstrative embodiments, radios 114, 144 and/or 164 may include, or may be associated with, a plurality of directional antennas.

In some demonstrative embodiments, device 102 may include a plurality of directional antennas 135, device 140 may include a plurality of directional antennas 145, and/or device 160 may include a plurality of directional antennas 165.

In some demonstrative embodiments, the plurality of directional antennas 135 may include at least a first directional antenna 137 and a second directional antenna 139, the plurality of directional antennas 145 may include at least a first directional antenna 147 and a second directional antenna 149, and/or the plurality of directional antennas 165 may include at least a first directional antenna 167 and a second directional antenna 169.

In some demonstrative embodiments, the plurality of directional antennas may include two directional antennas, e.g., as described above.

In some demonstrative embodiments, the plurality of directional antennas may include more than two directional antennas, e.g., three or more directional antennas.

In some demonstrative embodiments, directional antennas 137, 139, 147, 149, 167, and/or 169 may include any type of antennas suitable for transmitting and/or receiving wireless communication signals, blocks, frames, transmission streams, packets, messages and/or data. For example, antennas 137, 139, 147, 149, 167, and/or 169 may include any suitable configuration, structure and/or arrangement of one or more antenna elements, components, units, assemblies and/or arrays. Antennas 137, 139, 147, 149, 167, and/or 169 may include, for example, antennas suitable for directional communication, e.g., using beamforming techniques. For example, antennas 137, 139, 147, 149, 167, and/or 169 may include a phased array antenna, a multiple element antenna, a set of switched beam antennas, and/or the like. In some embodiments, antennas 137, 139, 147, 149, 167, and/or 169 may implement transmit and receive functionalities using separate transmit and receive antenna elements. In some embodiments, antennas 137, 139, 147, 149, 167, and/or 169 may implement transmit and receive functionalities using common and/or integrated transmit/receive elements.

In some demonstrative embodiments, antennas 137, 139, 147, 149, 167, and/or 169 may include a directional antenna, which may be steered to a plurality of beam directions.

In some demonstrative embodiments, a plurality of directional antennas, e.g., the plurality of directional antennas 135, the plurality of directional antennas 145 and/or the plurality of directional antennas 165, may be implemented as part of a single Phased Antenna Array (PAA). The PAA may have, for example, a rectangular geometry, e.g., including an integer number, denoted M, of rows, and in integer number, denoted N, of columns.

In some demonstrative embodiments, the PAA may be configured to communicate a plurality of diversity streams.

In one example, the PAA may be configured to communicate two or more spatial streams, e.g., being spatially separate from each other.

For example, the plurality of directional antennas 135 may be implemented as part of a single PAA. According to this example, directional antenna 137 may include one or more first elements of the PAA, and/or directional antenna 137 may include one or more second elements of the PAA.

In some demonstrative embodiments, the plurality of directional antennas may be implemented as part of a plurality of PAAs, for example, as a plurality of physically independent PAAs.

For example, the plurality of directional antennas 135 may be implemented by two PAAs. According to this example, directional antenna 137 may include a first PAA of the two PAAs, and/or directional antenna 137 may include a second PAA of the two PAAs.

In some demonstrative embodiments, device 102 may include a controller 124, and/or devices 140 and/or 160 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or 160 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102, 140 and/or 160 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102, 140 and/or 160 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

Some specifications, e.g., the IEEE 802.11ad-2012 Specification, may be configured to support a Single User (SU) system, in which a Station (STA) cannot transmit frames to more than a single STA at a time. Such specifications may not be able, for example, to support transmission from a STA to multiple STAs, e.g., simultaneously.

In some demonstrative embodiments, devices 102, 140, and/or 160 may be configured to support simultaneous transmission from a STA, e.g., a STA implemented by device 102, to multiple STAs, e.g., including a STA implemented by device 140 and/or a STA implemented by device 160, for example, using a multi-user MIMO (MU-MIMO) scheme, e.g., a downlink (DL) MU-MIMO, and/or any other MU scheme.

In some demonstrative embodiments, devices 102, 140 and/or 160 may be configured to implement one or more Multi-User (MU) mechanisms. For example, devices 102, 140 and/or 160 may be configured to implement one or more MU mechanisms, which may be configured to enable MU communication.

In some demonstrative embodiments, devices 102, 140 and/or 160 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including devices 140, 160 and/or one or more other devices, e.g., as described below.

In some demonstrative embodiments, devices 102, 140 and/or 160 may be configured to implement any other additional or alternative MU mechanism, e.g., to communicate MU transmissions; and/or any other MIMO mechanism, e.g., to communicate MIMO transmissions.

In some demonstrative embodiments, devices 102, 140 and/or 160 may be configured to communicate over a millimeter-wave (mmWave) wireless communication band. For example, devices 102, 140 and/or 160 may be configured to communicate MIMO communications over the mmWave wireless communication band.

In some demonstrative embodiments, devices 102, 140 and/or 160 may be configured to communicate over a Next Generation 60 GHz (NG60) network, an Extended DMG (EDMG) network, and/or any other network and/or any other frequency band. For example, devices 102, 140 and/or 160 may be configured to communicate DL MU-MIMO transmissions, for example, for communicating over the NG60 and/or EDMG networks.

In some demonstrative embodiments, devices 102, 140 and/or 160 may be configured to implement one or more techniques, which may, for example, enable to support communications over a MIMO communication channel, e.g., a SU-MIMO channel and/or a MU-MIMO channel, between two or more mmWave STAs.

In some demonstrative embodiments, devices 102, 140 and/or 160 may be configured to use an antenna polarization scheme configured to support communication over the MIMO communication channel between two or more mmWave STAs.

In some demonstrative embodiments, a directional antenna may be set according to a polarization setting to configure a polarization of waves radiated by the directional antenna.

In one example, the directional antenna may include a transducer configured to convert radio frequency electric current into electromagnetic waves. The electromagnetic waves may be radiated into space. An electric field or an "E" plane may determine the polarization or orientation of the electromagnetic waves.

In some demonstrative embodiments, a directional antenna, e.g., directional antennas 137, 139, 147, 149, 167, and/or 169, may have one or more polarization capabilities to radiate according to one or more polarization settings.

In some demonstrative embodiments, a directional antenna, e.g., directional antennas 137, 139, 147, 149, 167, and/or 169, may include a dual-polarization antenna configured to simultaneously radiate two electromagnetic waves according to two respective different polarizations settings.

In some demonstrative embodiments, the two electromagnetic waves may carry two independent data streams.

In some demonstrative embodiments, a directional antenna, e.g., directional antennas 137, 139, 147, 149, 167, and/or 169, may include a single-polarization antenna configured to radiate at a given time a single electromagnetic wave according to a polarization setting. In one example, a single-polarization antenna may be switched, e.g., sequentially, between two or more polarization settings. In another example, a single-polarization antenna may be set only to a single polarization setting.

In some demonstrative embodiments, a directional antenna, e.g., directional antennas 137, 139, 147, 149, 167, and/or 169, may include a multi-polarization antenna configured to simultaneously radiate more than two, e.g., three or more, electromagnetic waves according to more than two polarizations settings.

In some demonstrative embodiments, the polarization capabilities of the directional antenna may include a circular polarization capability to communicate according to a circular polarization setting, e.g., as described below with reference to FIG. 2A.

In some demonstrative embodiments, the circular polarization capability may include a left-hand circular polarization capability to communicate according to a left-hand circular polarization (LHCP) setting.

In some demonstrative embodiments, the circular polarization capability may include a right-hand circular polarization capability to communicate according to a right-hand circular polarization (RHCP) setting.

In some demonstrative embodiments, the polarization capabilities of the directional antenna may include a linear polarization capability to communicate according to a linear polarization setting, e.g., as described below with reference to FIGS. 2B and 2C.

In some demonstrative embodiments, the linear polarization capability may include a vertically polarized capability to communicate according to a vertically polarized setting, e.g., as described below with reference to FIG. 2B In some demonstrative embodiments, the linear polarization capability may include a horizontally polarized capability to communicate according to a horizontally polarized setting, e.g., as described below with reference to FIG. 2C.

In other embodiments, the linear polarization settings may include any additional or alternative linear polarization settings and/or capabilities.

In other embodiments, the polarization capabilities of the directional antenna may include any other additional or alternative polarization settings and/or polarization capabilities.

Figure 2A:
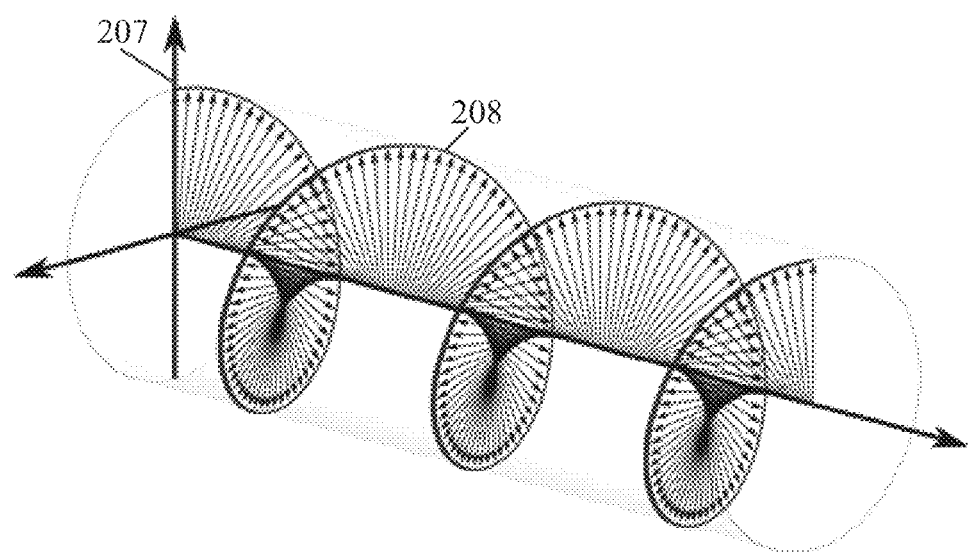
FIGS. 2A-2C are schematic illustrations of three respective polarization settings of a directional antenna, in accordance with some demonstrative embodiments.
Figure 2B:
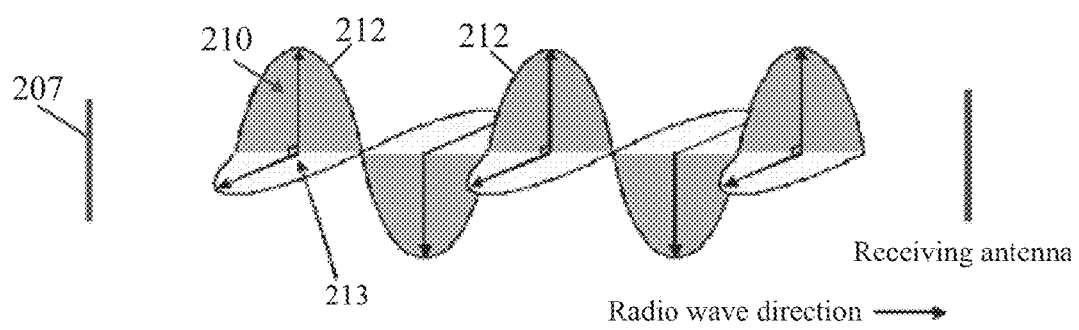
Figure 2C:
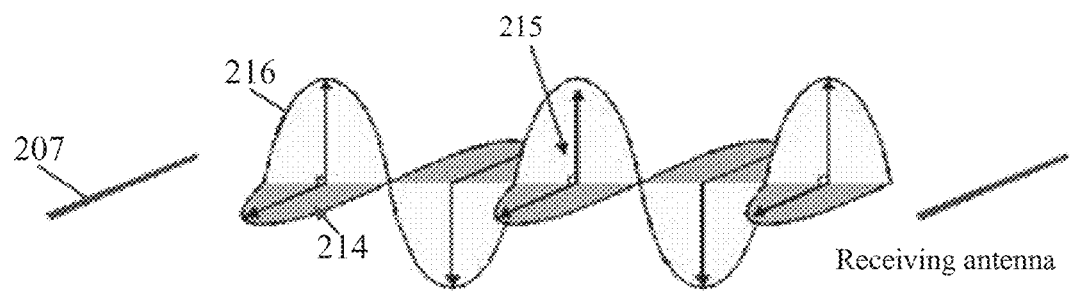

Reference is made to FIGS. 2A-2C, which schematically illustrate three respective polarization settings of a directional antenna 207, in accordance with some demonstrative embodiments. For example, directional antenna 207 may perform the functionality of directional antennas 137, 139, 147, 149, 167, and/or 169 (FIG. 1).

A shown in FIG. 2A, directional antenna 207 may have the capability to operate as a circular polarized antenna to communicate a circular polarized wave 208.

A shown in FIG. 2A, a plane of polarization of the circular polarized wave 208, radiated from directional antenna 207, may be rotated in a circle, and may complete a revolution during a period of the wave.

In some demonstrative embodiments, the plane of polarization of the circular polarized wave 208 may be rotated in a first direction, e.g., according to the RHCP setting, or in a second, e.g., opposite direction, for example, according to the LHCP setting.

A shown in FIG. 2A, the circular polarized wave 208 may radiate energy in both the horizontal plane and the vertical plane, and all other planes between the horizontal plane and the vertical plane.

In some demonstrative embodiments, a linear polarized antenna may radiate in one plane, which may include a direction of propagation of a linear polarized wave.

As shown in FIG. 2B, directional antenna 207 may have the capability to operate as a vertically polarized antenna to communicate a vertically polarized wave 212.

As shown in FIG. 2B, an electric field 210 of the vertically polarized wave 212 may be perpendicular to a magnetic field 213 of the vertically polarized wave 212, and perpendicular to the ground.

As shown in FIG. 2C, directional antenna 207 may have the capability to operate as a horizontally polarized antenna to communicate a horizontally polarized wave 216.

As shown in FIG. 2C, an electric field 214 of the horizontally polarized wave 216 may be perpendicular to a magnetic field 215 of the horizontally polarized wave 216, and may be parallel to the ground.

Referring back to FIG. 1, in some demonstrative embodiments, devices 102, 140 and/or 160 may be configured to communicate over a MIMO channel, e.g., a SU-MIMO channel and/or a MU-MIMO channel, between devices 102, 140 and/or 160, e.g., based on the polarization settings and/or polarization capabilities of the plurality directional antennas of devices 102, 140 and/or 160.

In some demonstrative embodiments, the polarization settings and/or polarization capabilities of the plurality directional antennas of devices 102, 140 and/or 160 may be configured to implement MIMO communications, e.g., SU-MIMO and/or MU-MIMO communications, between devices 102, 140 and/or 160.

In some demonstrative embodiments, the polarization settings and/or polarization capabilities of the plurality of directional antennas of devices 102, 140 and/or 160 may enable to perform MIMO communications, e.g., SU-MIMO and/or MU-MIMO communications, between devices 102, 140 and/or 160, for example, in an effective manner, e.g., to achieve a higher capacity of communication.

In one example, two or more directional antennas of a device may be set to use different polarization settings, e.g., for each antenna. Accordingly, a MIMO channel, between the device and another device, may be created, e.g., with a sufficient level of isolation between signals transmitted from the antennas of the device, for example, when the other device uses the same polarization settings for each antenna.

In some demonstrative embodiments, devices 102, 140 and/or 160 may efficiently communicate over the MIMO channel, e.g., the SU-MIMO channel and/or the MU-MIMO channel, between devices 102, 140 and/or 160, for example, if the polarization settings of directional antennas 137, 139, 147, 149, 167, and/or 169 are properly aligned, setup, and/or applied.

In some demonstrative embodiments, a maximal signal strength of a signal communicated between a first device and a second device of devices 102, 140 and/or 160 may be achieved, for example, if both the first and second devices are using the same polarization settings for the plurality of directional antennas.

In one example, a signal attenuation of the signal communicated between the first and second devices may be in the magnitude of between a few decibel to square meter (dBs) and over 20 dBs, for example, if the first and second devices do not use the same polarization settings and/or due to misalignment of the polarization settings between the devices.

In some demonstrative embodiments, devices 102, 140 and/or 160 may be configured to use the polarization settings of the plurality of directional antennas to enable efficient MIMO communication, e.g., the SU-MIMO and/or MU-MIMO communications, between devices 102, 140 and/or 160.

In some demonstrative embodiments, a device of devices 102, 140 and/or 160 may not be able to efficiently communicate MIMO communication, e.g., SU-MIMO and/or MU-MIMO communications, with one or more other devices of devices 102, 140 and/or 160 ("the peer devices"), for example, if the peer devices are not aware of the polarization settings of the plurality of directional antennas of the device.

In some demonstrative embodiments, the peer devices may not be able to properly apply, align, and/or adjust the polarization settings of the directional antennas of the peer devices to communicate with the device, for example, if the peer devices are not aware of the polarization settings of the plurality of directional antennas of the device.

For example, device 140 may not be able to efficiently communicate a SU-MIMO communication with device 102, for example, if device 140 is not aware of the polarization settings of the plurality of directional antennas 135, e.g., a polarization setting of directional antenna 137, and/or a polarization setting of directional antenna 139.

In another example, devices 140 and 160 may not be able to efficiently communicate a MU-MIMO communication with device 102, for example, if devices 140 and 160 are not aware of the polarization settings of the plurality of directional antennas 135.

In some demonstrative embodiments, a first device of devices 102, 140, and/or 160, e.g., device 102, may be configured to signal and/or to transmit information with respect to the polarization settings and/or polarization capabilities of the device, for example, to one or more second devices of devices 102, 140 and/or 160, e.g., to devices 140 and/or 160.

In some demonstrative embodiments, the one or more second devices may use the polarization settings to communicate MIMO communication with the first device, for example, based on the information with respect to the polarization settings and/or polarization capabilities of the first device.

In some demonstrative embodiments, a device, e.g., device 102, may transmit a frame including an information element including the information with respect to the polarization settings and/or polarization capabilities of the device.

In some demonstrative embodiments, device 102 may be configured to generate the information element.

In some demonstrative embodiments, message processor 128 may generate the information element.

In some demonstrative embodiments, the information element may include a plurality of antenna identifiers of the plurality of directional antennas 135 of device 102.

For example, the information element may include a first antenna identifier to identify directional antenna 137 of device 102, and/or a second antenna identifier to identify directional antenna 139 of device 102.

In some demonstrative embodiments, the information element may include a plurality of polarization indicators.

In some demonstrative embodiments, the plurality of polarization indicators may correspond to the plurality of antenna identifiers.

For example, the information element may include a first polarization indicator corresponding to the first antenna identifier of directional antenna 137, and/or a second polarization indicator corresponding to the second antenna identifier of directional antenna 139.

In some demonstrative embodiments, a polarization indicator corresponding to an antenna identifier may indicate a polarization setting and/or a polarization capability of a directional antenna identified by the antenna identifier.

For example, the first polarization indicator may indicate a polarization setting and/or a polarization capability of directional antenna 137; and/or the second polarization indicator may indicate a polarization setting and/or a polarization capability of directional antenna 139.

In some demonstrative embodiments, the polarization setting may include a vertically polarized setting, a horizontally polarized setting, or a circularly polarized setting.

In other embodiments, the polarization setting may include any one or more other additional or alternative polarization settings.

In some demonstrative embodiments, device 102 may send a frame including the information element.

For example, transmitter 118 may transmit the frame to devices 104 and/or 160.

In some demonstrative embodiments, devices 140 and/or 160 may receive the frame, and may be aware of the polarization settings and/or the polarization capabilities of the plurality of antennas 135 of device 102.

In some demonstrative embodiments, device 140 may set, align, and/or adjust the plurality of directional antennas 145, for example, based on the information element in the received frame from device 102.

In some demonstrative embodiments, device 160 may set, align, and/or adjust the plurality of directional antennas 165, for example, based on the information element in the received frame from device 102.

In some demonstrative embodiments, device 140 may send to device 102 an information element including polarization settings and/or polarization capabilities of the plurality of antennas 145 of device 140.

In some demonstrative embodiments, device 160 may send to device 102 an information element including polarization settings and/or polarization capabilities of the plurality of antennas 165 of device 160.

In some demonstrative embodiments, device 102 may negotiate with devices 140 and/or 160 polarization settings to be used for MIMO communication between devices 102, 140 and/or 160. For example, devices 102, 140 and/or 160 may exchange the information elements including the polarization settings and/or polarization settings of devices 102, 140 and/or 160, to negotiate a polarization scheme to be used for a MIMO communication between devices 102, 140 and/or 160.

In some demonstrative embodiments, device 102 may communicate a MIMO communication via the plurality of directional antennas 135 configured according to the plurality of polarization settings indicated by the plurality of polarization indicators in the information element sent by device 102.

In some demonstrative embodiments, at least two antenna identifiers of the plurality of antenna identifiers may identify at least two different directional antennas of directional antennas 135.

In some demonstrative embodiments, the plurality of polarization indicators may include at least two different polarization indicators to indicate at least two respective different polarization settings of the at least two different directional antennas.

In some demonstrative embodiments, device 102 may communicate a MIMO communication via the at least two directional antennas according to the at least two different polarization settings.

In one example, device 102 may communicate a MIMO communication via directional antennas 135 using two different polarization settings, e.g., by setting directional antenna 137 to a first polarization setting, e.g., a horizontally polarized setting, and setting directional antenna 139 to a second polarization setting, which may be different from the first polarization setting, e.g., a vertically polarized setting. According to this example, device 102 may transmit an information element including the first polarization indicator indicating the horizontally polarized setting of antenna 137, and the second polarization indicator indicating the vertically polarized setting of antenna 139.

In some demonstrative embodiments, at least two antenna identifiers of the plurality of antenna identifiers may identify the same directional antenna, e.g., directional antenna 139.

In some demonstrative embodiments, the plurality of polarization indicators may include at least two different polarization indicators to indicate at least two respective different polarization settings of directional antenna 139.

In some demonstrative embodiments, the two respective different polarization settings may be sequentially applied to directional antenna 139.

In one example, device 102 may communicate a MIMO communication via directional antenna 139, for example, while dynamically switching between at least two different polarization settings of directional antenna 139, e.g., the horizontally polarized setting and the vertically polarized setting. According to this example, device 102 may transmit an information element including the antenna identifier of antenna 139 twice, e.g., with a first polarization indicator indicating the horizontally polarized setting, and with a second polarization indicator indicating the vertically polarized setting.

In some demonstrative embodiments, a directional antenna may include a dual polarization antenna, e.g., an antenna configured to communicate using two different polarization settings simultaneously.

In some demonstrative embodiments, directional antenna 139 may include a dual polarization antenna. According to this example, the two respective different polarization settings, e.g., a vertically polarized setting and a horizontally polarized setting, may be simultaneously applied to directional antenna 139.

In some demonstrative embodiments, controller 124 may control directional antenna 139 to simultaneously radiate first and second electromagnetic waves.

In some demonstrative embodiments, controller 124 may control directional antenna 139 to radiate the first electromagnetic wave according to a vertically polarized setting, and to radiate the second electromagnetic wave according to a horizontally polarized setting.

In one example, the first and second electromagnetic waves may be configured to carry two independent data streams. For example, the first electromagnetic wave may be configured to carry a first data stream, e.g., according to the vertically polarized setting, and the second electromagnetic wave may be configured to carry a second, e.g., independent, data stream, e.g., according to the horizontally polarized setting.

In some demonstrative embodiments, simultaneously applying the two respective different polarization settings to directional antenna 139 may enable directional antenna 139 to perform MIMO communication over two spatial paths, each path having a different polarization setting, e.g., as described below with reference to FIGS. 4 and/or 5.

In some demonstrative embodiments, the information element may include a plurality of pairs of configuration fields, e.g., as described below with reference to FIG. 3.

In some demonstrative embodiments, the information element may include a field ("length field") to indicate a number of the plurality of pairs of configuration fields, e.g., as described below with reference to FIG. 3.

In some demonstrative embodiments, a pair of configuration fields corresponding to a directional antenna may include an antenna identifier (ID) field, and a polarization indication field.

In some demonstrative embodiments, the antenna ID field may include the antenna identifier, and the polarization indication field may include the polarization indicator.

In one example, an information element may include a first pair of configuration fields corresponding to directional antenna 137, e.g., including the first antenna identifier of directional antenna 137, and the first polarization indicator of a polarization setting corresponding to the directional antenna 137; and/or a second pair of configuration fields corresponding to directional antenna 139, e.g., including the second antenna identifier of the directional antenna 139, and the second polarization indicator of a polarization setting corresponding to the directional antenna 139. According to this example, the length field of the information element may include the number 2.

Figure 3:
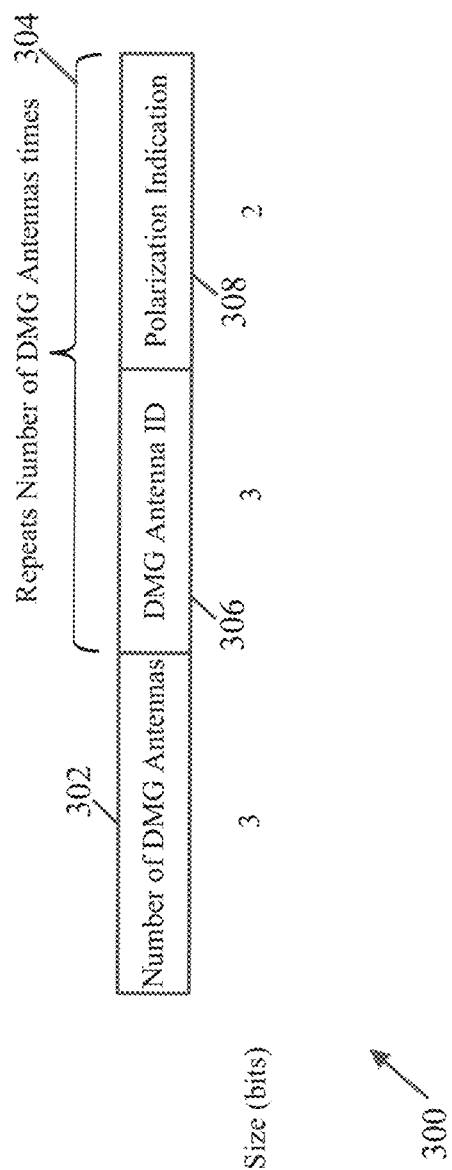
FIG. 3 is a schematic illustration of an information element (IE), in accordance with some demonstrative embodiments.

Reference is made to FIG. 3, which schematically illustrates an information element 300, in accordance with some demonstrative embodiments. For example, message processor 128 (FIG. 1) may generate information element 300 to be transmitted by device 102 (FIG. 1); and/or message processor 148 (FIG. 1) may process information element 300 received by device 140 (FIG. 1).

As shown in FIG. 3, information element 300 may include one or more pairs of configuration fields 304, including configuration fields 306 and 308.

As shown in FIG. 3, information element 300 may include a length field 302 to indicate a number of pairs of configuration fields 304.

In some demonstrative embodiments, configuration fields 304 may be repeated in information element 300, for example, according to the number indicated by length field 302.

As shown in FIG. 3, field 306 may include an antenna ID field to identify a directional antenna, and/or field 308 may include a polarization indication field to indicate a polarization setting of the directional antenna indicated by antenna ID field 306.

In some demonstrative embodiments, antenna ID field 306 may include an antenna identifier to identify the directional antenna, and polarization indication field 308 may include a polarization indicator to indicate the polarization setting of the directional antenna.

In some demonstrative embodiments, polarization indication field 308 may include a value selected from a plurality of values to indicate the polarization setting of the directional antenna, e.g., as follows:

TABLE 1

| Value | Polarization Indication |
|---|---|
| 0 | Vertically polarized |
| 1 | Horizontally polarized |
| 2 | Left-hand Circularly polarized |
| 3 | Right-hand Circularly polarized |
| 4 | Reserved |

In other embodiments, polarization indication field 308 may include any other value to indicate the polarization settings and/or any other additional or alternative polarization settings and/or polarization capabilities.

In one example, information element 300 may include a length field 302 including the value 2, a first pair of configuration fields 304, and a second pair of configuration fields 304. The first pair of configuration fields 304 may include a first field 306 including the first antenna indicator to identify antenna 137, and a first field 308 including the value "1"; and the second pair of configuration fields 304 may include a second field 306 including the second antenna indicator to identify antenna 139, and a second field 308 including the value "2". According to this example, the directional antenna 137 (FIG. 1) may be set to the horizontally polarized setting, and directional antenna 139 (FIG. 1) may be set to the left-hand circularly polarized setting.

In another example, information element 300 may include a field 302 including the value 2, a first pair of configuration fields 304, and a second pair of configuration fields 304. The first pair of configuration fields 304 may include a first field 306 including the first antenna indicator to identify antenna 137, and a first field 308 including the value "0"; and the second pair of configuration fields 304 may include a second field 306 including the same first antenna indicator to identify antenna 137, and a second field 308 including the value "1". According to this example, the directional antenna 137 (FIG. 1) may have the capability of being set to the horizontally polarized setting or the vertically polarized setting.

Referring back to FIG. 1, in some demonstrative embodiments, device 102 may send a frame including an information element, e.g., information element 300 (FIG. 3).

In some demonstrative embodiments, device 102 may communicate a MIMO communication via the plurality of directional antennas 135 configured according to the plurality of polarization settings indicated by the plurality of polarization indicators in information element 300 (FIG. 3).

In some demonstrative embodiments, device 140 and/or device 160 may process the information element from device 102, and device 140 may set the polarization settings of antennas 145 and/or device 160 may set the polarization settings of antennas 165, e.g., based on the polarization settings indicated by the information element from device 102.

In some demonstrative embodiments, the MIMO communication may include MIMO communication over the mmWave wireless communication band.

In some demonstrative embodiments, the MIMO communication may include a multi user (MU) MIMO communication, e.g., as described below with reference to FIGS. 4 and 5.

In some demonstrative embodiments, the MIMO communication may include a single user (SU) MIMO communication, e.g., as described below with reference to FIGS. 4 and 5.

Figure 4:
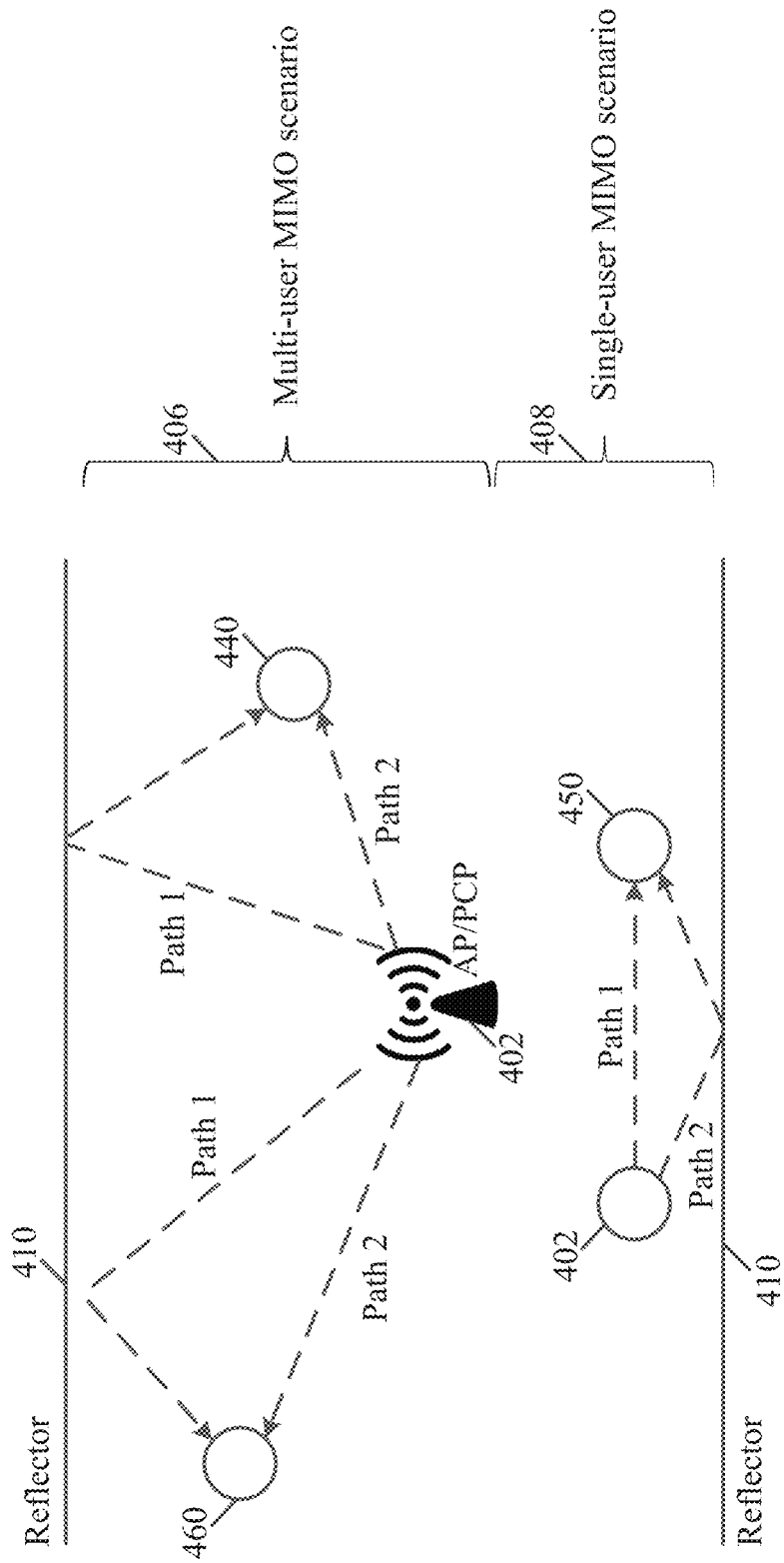
FIG. 4 is a schematic illustration of communications according to a Multi-User (MU) Multiple In Multiple Out (MIMO) scheme, and a Single User (SU) MIMO scheme in a first scenario, in accordance with some demonstrative embodiments.

Reference is made to FIG. 4, which schematically illustrates communications according to a Multi-user MIMO scheme 406, and a single-user MIMO scheme 408 in a first scenario, in accordance with some demonstrative embodiments.

In one example, device 102 (FIG. 1) may communicate with devices 140 and 160 (FIG. 1), for example, according to Multi-user MIMO scheme 406.

In one example, device 102 (FIG. 1) may communicate with a device of devices 140 and 160 (FIG. 1), for example, according to Single-user-MIMO scheme 406.

As shown in FIG. 4, a device 402 may communicate with devices 440 and 460 according to Multi-user MIMO scheme 406. For example, device 402 may perform the functionality of device 102 (FIG. 1), device 440 may perform the functionality of device 140 (FIG. 1), and/or device 460 may perform the functionality of device 160 (FIG. 1).

As shown in FIG. 4, device 402 may communicate with a device 450 according to single-user MIMO scheme 408. For example, device 450 may perform the functionality of device 140 or device 160 (FIG. 1).

As shown in FIG. 4, at least part of the communication signals according to the MU-MIMO scheme 406 and the SU-MIMO scheme 408 may be communicated via a path, which is not in a line of sight between devices 402, 440, 460 and/or 450.

As shown in FIG. 4, at least part of the communication signals according to the MU-MIMO scheme 406, and the SU-MIMO scheme 408 between devices 402, 440, 460 and/or 450 may be reflected by a reflector 410.

As shown in FIG. 4, device 402 may communicate with devices 440, 460 and/or 450 using two directional antennas having two different respective polarization settings.

As shown in FIG. 4, setting the two directional antennas according to two different respective polarization settings may provide a MIMO channel 417.

As shown in FIG. 4, MIMO channel 417 may have sufficient isolation between first and second transmitted signals, e.g., transmitted by the two directional antennas.

As shown in FIG. 4, MIMO channel 417 may include a first path, denoted Path 1, and a second path, denoted Path 2.

As shown in FIG. 4, the first path and the second path may include two different spatial streams, e.g., being spatially separate from each other.

As shown in FIG. 4, the first path and the second path may have sufficient isolation from each other, for example, an isolation level greater than 20 dB.

As shown in FIG. 4, the first path and the second path may have a sufficient isolation level, for example, even when the first path and/or the second path are not line of sight (LOS) paths. For example, the first path and the second path may have sufficient isolation, for example, even when the first path and/or the second path are reflected from reflector 410.

Figure 5:
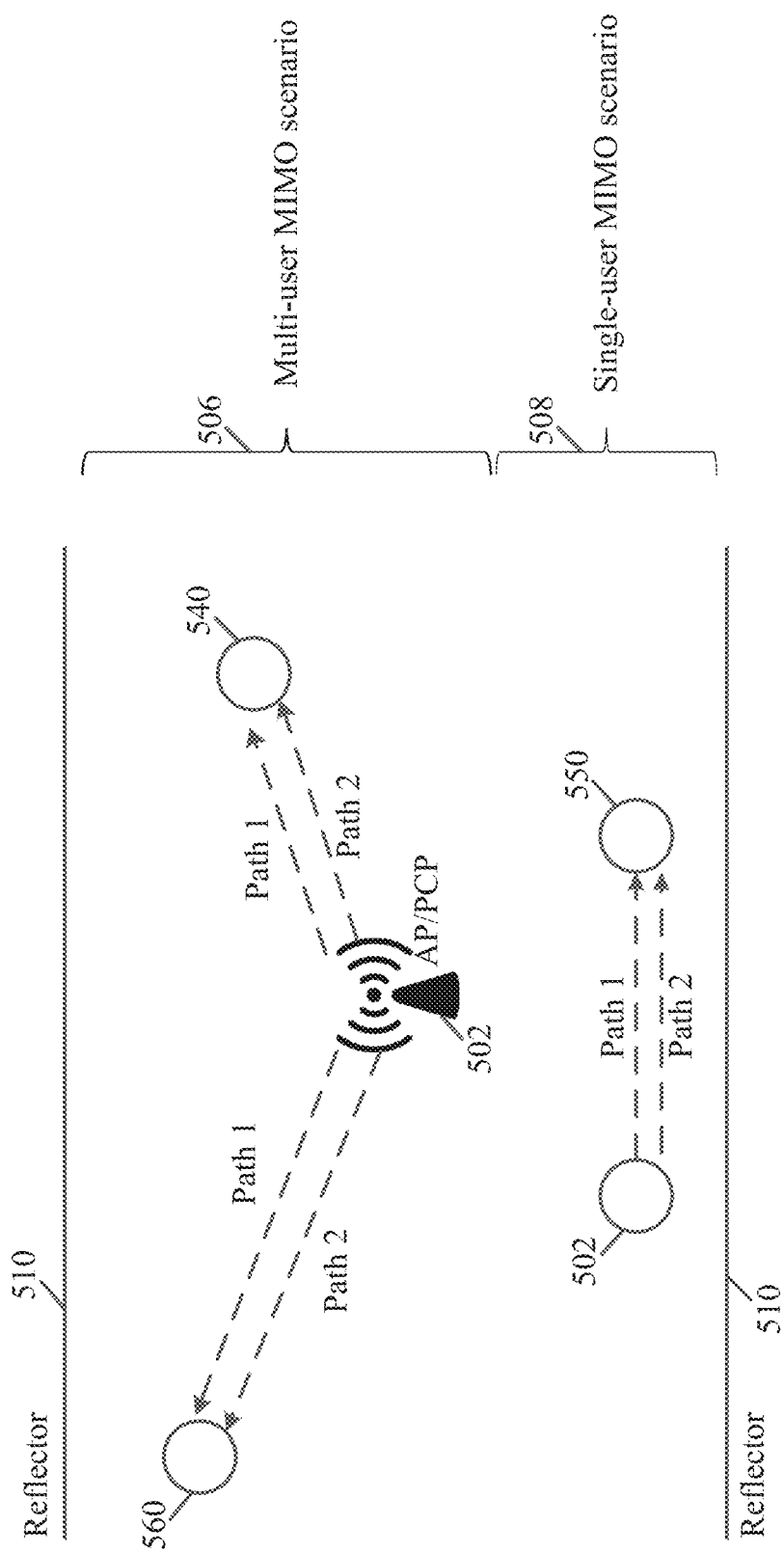
FIG. 5 is a schematic illustration of communications according to a MU MIMO scheme and a SU MIMO scheme in a second scenario, in accordance with some demonstrative embodiments.

Reference is made to FIG. 5, which schematically illustrates communications according to a Multi-user MIMO scheme 506, and a single-user MIMO scheme 508 in a second scenario, in accordance with some demonstrative embodiments.

In one example, device 102 (FIG. 1) may communicate with devices 140 and 160 (FIG. 1), for example, according to Multi-user MIMO scheme 506.

In one example, device 102 (FIG. 1) may communicate with a device of devices 140 and 160 (FIG. 1), for example, according to Single-user-MIMO scheme 506.

As shown in FIG. 5, a device 502 may communicate with devices 540 and 560 according to Multi-user MIMO scheme 406. For example, device 502 may perform the functionality of device 102 (FIG. 1), device 540 may perform the functionality of device 140 (FIG. 1), and/or device 560 may perform the functionality of device 160 (FIG. 1).

As shown in FIG. 5, device 502 may communicate with a device 550 according to single-user MIMO scheme 508. For example, device 550 may perform the functionality of device 140 or device 160 (FIG. 1).

As shown in FIG. 5, the communications according to the MU-MIMO scheme 506 and the SU-MIMO scheme 508 may be performed via a line of sight (LOS) between devices 502, 540, 560 and/or 550.

As shown in FIG. 5, devices 502, 540, 560 and/or 550 may communicate directly with each other, e.g., according to the MU-MIMO scheme 506, and the SU-MIMO scheme 508, for example, without utilizing any reflection from a reflector 510.

As shown in FIG. 5, device 502 may communicate with devices 540, 560 and/or 550 using two directional antennas having two respective polarization settings.

As shown in FIG. 5, using two directional antennas according to two different respective polarization settings may create a MIMO channel 517.

As shown in FIG. 5, MIMO channel 517 may have sufficient isolation between first and second transmitted signals, e.g., transmitted by the two directional antennas.

As shown in FIG. 5, MIMO channel 517 may include a first path, denoted Path 1, and a second path, denoted Path 2.

As shown in FIG. 5, the first path and the second path may include two different spatial streams, e.g., being spatially separate from each other.

As shown in FIG. 5, the first path and the second path may have a sufficient level of isolation, for example, an isolation level greater than 20 dB.

As shown in FIG. 5, the first path and the second path may have a sufficient isolation, for example, even when the first path and/or the second path are line of sight paths.

Figure 6:
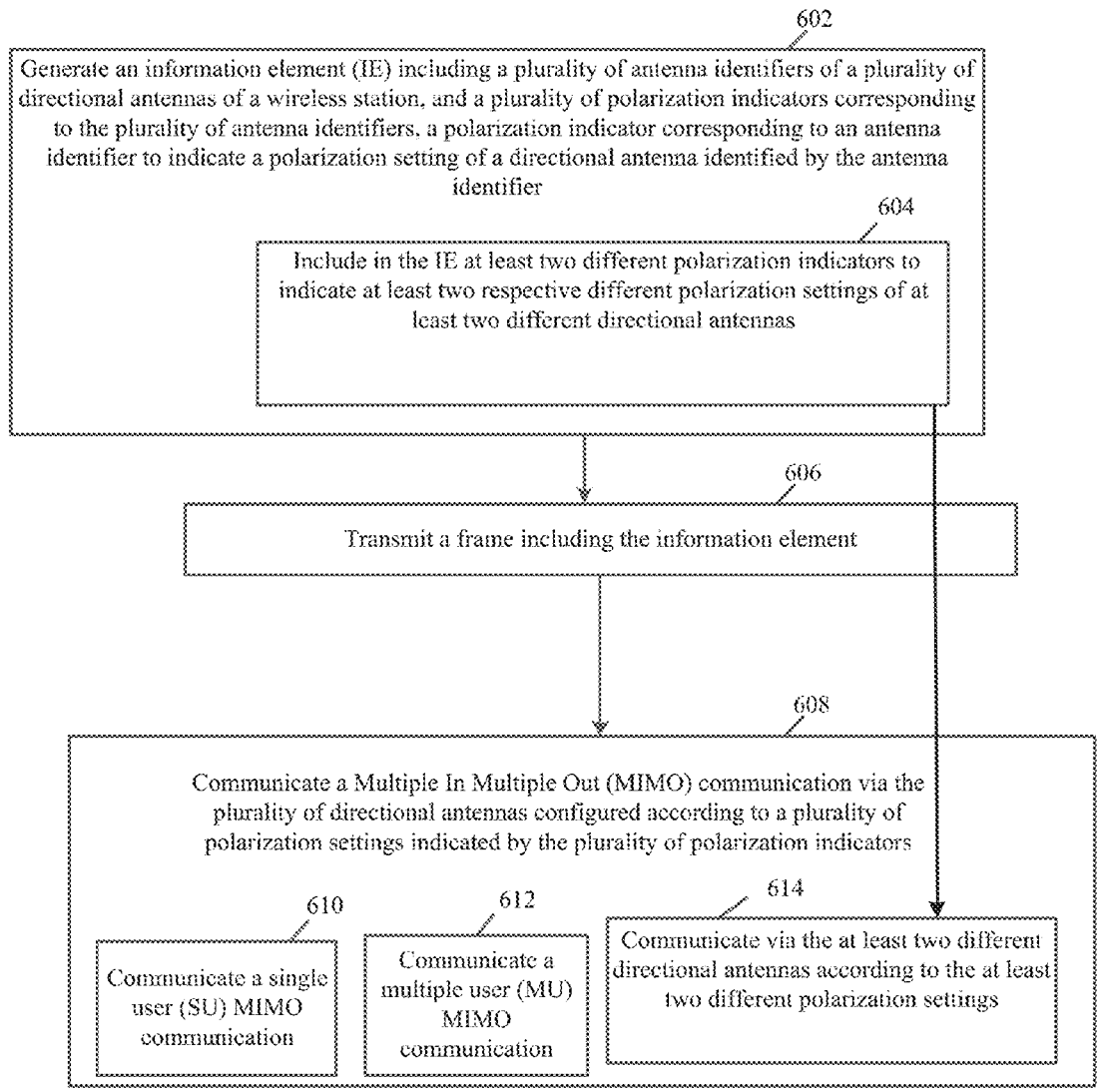
FIG. 6 is a schematic flow-chart illustration of a method of wireless communication via polarized antennas, in accordance with some demonstrative embodiments.

Reference is made to FIG. 6, which schematically illustrates a method of wireless communication via polarized antennas, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), device 160 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include generating at a station an information element including a plurality of antenna identifiers of a plurality of directional antennas of the wireless station, and a plurality of polarization indicators corresponding to the plurality of identifiers, a polarization indicator corresponding to an antenna identifier to indicate a polarization setting of a directional antenna identified by the antenna identifier. For example, device 102 (FIG. 1) may generate information element 300 (FIG. 3), e.g., as described above.

As indicated at block 604, generating the information element may include generating an information element including at least two different polarization indicators to indicate at least two respective different polarization settings of at least two directional antennas. For example, the information element 300 (FIG. 3) may include the first and second antenna identifiers and the at least two different polarization indicators, e.g., as described above.

As indicated at block 606, the method may include transmitting a frame including the information element. For example, transmitter 118 (FIG. 1) may transmit the frame including information element 300 (FIG. 3), e.g., as described above.

As indicated at block 608, the method may include communicating a MIMO communication via the plurality of directional antennas configured according to a plurality of polarization settings indicated by the plurality of polarization indicators. For example, device 102 (FIG. 1) may communicate a MIMO communication via the plurality of directional antennas 135 (FIG. 1) configured according to the plurality of polarization settings indicated by the plurality of polarization indicators including in information element 300 (FIG. 3), e.g., as described above.

As indicated at block 610, communicating the MIMO communication may include communicating a MU MIMO communication. For example, device 102 (FIG. 1) may communicate a MU MIMO communication with devices 140 and 160 (FIG. 1), e.g., as described above.

As indicated at block 612, communicating the MIMO communication may include communicating a SU MIMO communication. For example, device 102 (FIG. 1) may communicate a SU MIMO communication with device 140 or with device 160 (FIG. 1), e.g., as described above.

As indicated at block 614, communicating the MIMO communication may include communicating a MIMO communication via the at least two directional antennas according to the at least two different polarization settings. For example, device 102 (FIG. 1) may communicate the MIMO communication according to the at least two different polarization settings, e.g., as described above.

Figure 7:
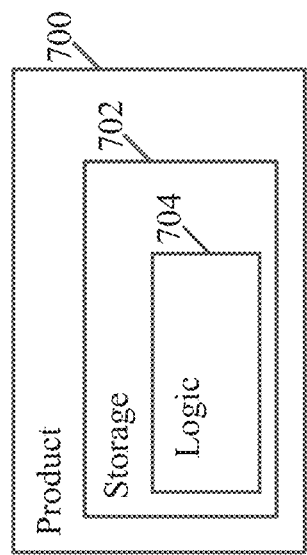
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102, 140 and/or 160 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations and/or functionalities, for example, one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless station to generate an information element comprising a plurality of antenna identifiers of a plurality of directional antennas of the wireless station, and a plurality of polarization indicators corresponding to the plurality of antenna identifiers, a polarization indicator corresponding to an antenna identifier to indicate a polarization setting of a directional antenna identified by the antenna identifier; and transmit a frame comprising the information element.

Example 2 includes the subject matter of Example 1, and optionally, wherein the apparatus is configured to cause the wireless station to communicate a Multiple In Multiple Out (MIMO) communication via the plurality of directional antennas configured according to a plurality of polarization settings indicated by the plurality of polarization indicators.

Example 3 includes the subject matter of Example 2, and optionally, wherein the MIMO communication comprises a Multi User (MU) MIMO communication.

Example 4 includes the subject matter of Example 2, and optionally, wherein the MIMO communication comprises a single user (SU) MIMO communication.

Example 5 includes the subject matter of any one of Examples 2-4, and optionally, wherein the MIMO communication comprises a MIMO communication over a millimeter wave (mmWave) wireless communication band.

Example 6 includes the subject matter of any one of Examples 1-5, and optionally, wherein the information element comprises a plurality of pairs of configuration fields, a pair of configuration fields corresponding to the directional antenna comprising an antenna identifier (ID) field and a polarization indication field, the antenna ID field comprising the antenna identifier, and the polarization indication field comprising the polarization indicator.

Example 7 includes the subject matter of Example 6, and optionally, wherein the information element comprises a field to indicate a number of the plurality of pairs of configuration fields.

Example 8 includes the subject matter of any one of Examples 1-7, and optionally, wherein the polarization setting comprises a setting selected from a group consisting of a vertically polarized setting, a horizontally polarized setting, a left-hand circularly polarized (LHCP) setting, and a right-hand circularly polarized (RHCP) setting.

Example 9 includes the subject matter of any one of Examples 1-8, and optionally, wherein at least two antenna identifiers of the plurality of antenna identifiers identify two different directional antennas of the wireless station, the plurality of polarization indicators comprise at least two different polarization indicators to indicate at least two respective different polarization settings of the at least two different directional antennas.

Example 10 includes the subject matter of Example 9, and optionally, wherein the apparatus is configured to cause the wireless station to communicate a MIMO communication via the at least two different directional antennas according to the at least two different polarization settings.

Example 11 includes the subject matter of any one of Examples 1-10, and optionally, wherein at least two antenna identifiers of the plurality of antenna identifiers identify the same directional antenna, the plurality of polarization indicators comprise at least two different polarization indicators to indicate at least two respective different polarization settings of the same directional antenna.

Example 12 includes the subject matter of Example 11, and optionally, wherein the two different polarization settings are to be sequentially applied to the same directional antenna.

Example 13 includes the subject matter of Example 11, and optionally, wherein the same directional antenna comprises a dual polarization antenna, the two different polarization settings are to be simultaneously applied to the dual polarization antenna.

Example 14 includes the subject matter of any one of Examples 1-13, and optionally, wherein the wireless station is a Directional Multi-Gigabit (DMG) Station (STA).

Example 15 includes the subject matter of any one of Examples 1-14, and optionally, comprising a transmitter to transmit the frame.

Example 16 includes the subject matter of any one of Examples 1-15, and optionally, comprising the plurality of directional antennas, a memory, and a processor.

Example 17 includes a method to be performed at a wireless station, the method comprising generating an information element comprising a plurality of antenna identifiers of a plurality of directional antennas of the wireless station, and a plurality of polarization indicators corresponding to the plurality of identifiers, a polarization indicator corresponding to an antenna identifier to indicate a polarization setting of a directional antenna identified by the antenna identifier; and transmitting a frame comprising the information element.

Example 18 includes the subject matter of Example 17, and optionally, comprising communicating a Multiple In Multiple Out (MIMO) communication via the plurality of directional antennas configured according to a plurality of polarization settings indicated by the plurality of polarization indicators.

Example 19 includes the subject matter of Example 18, and optionally, wherein the MIMO communication comprises a Multi User (MU) MIMO communication.

Example 20 includes the subject matter of Example 18, and optionally, wherein the MIMO communication comprises a single user (SU) MIMO communication.

Example 21 includes the subject matter of any one of Examples 18-20, and optionally, wherein the MIMO communication comprises a MIMO communication over a millimeter wave (mmWave) wireless communication band.

Example 22 includes the subject matter of any one of Examples 17-21, and optionally, wherein the information element comprises a plurality of pairs of configuration fields, a pair of configuration fields corresponding to the directional antenna comprising an antenna identifier (ID) field and a polarization indication field, the antenna ID field comprising the antenna identifier, and the polarization indication field comprising the polarization indicator.

Example 23 includes the subject matter of Example 22, and optionally, wherein the information element comprises a field to indicate a number of the plurality of pairs of configuration fields.

Example 24 includes the subject matter of any one of Examples 17-23, and optionally, wherein the polarization setting comprises a setting selected from a group consisting of a vertically polarized setting, a horizontally polarized setting, a left-hand circularly polarized (LHCP) setting, and a right-hand circularly polarized (RHCP) setting.

Example 25 includes the subject matter of any one of Examples 17-24, and optionally, wherein at least two antenna identifiers of the plurality of antenna identifiers identify two different directional antennas of the wireless station, the plurality of polarization indicators comprise at least two different polarization indicators to indicate at least two respective different polarization settings of the at least two different directional antennas.

Example 26 includes the subject matter of Example 25, and optionally, comprising communicating a MIMO communication via the at least two different directional antennas according to the at least two different polarization settings.

Example 27 includes the subject matter of any one of Examples 17-26, and optionally, wherein at least two antenna identifiers of the plurality of antenna identifiers identify the same directional antenna, the plurality of polarization indicators comprise at least two different polarization indicators to indicate at least two respective different polarization settings of the same directional antenna.

Example 28 includes the subject matter of Example 27, and optionally, wherein the two different polarization settings are to be sequentially applied to the same directional antenna.

Example 29 includes the subject matter of Example 27, and optionally, wherein the same directional antenna comprises a dual polarization antenna, the two different polarization settings are to be simultaneously applied to the dual polarization antenna.

Example 30 includes the subject matter of any one of Examples 17-29, and optionally, wherein the wireless station is a Directional Multi-Gigabit (DMG) Station (STA).

Example 31 includes a product comprising one or more tangible computer-readable non-transitory storage media comprising computer-executable instructions operable to, when executed by at least one computer processor, enable the at least one computer processor to implement one or more operations at a wireless station, the operations comprising generating an information element comprising a plurality of antenna identifiers of a plurality of directional antennas of the wireless station, and a plurality of polarization indicators corresponding to the plurality of identifiers, a polarization indicator corresponding to an antenna identifier to indicate a polarization setting of a directional antenna identified by the antenna identifier; and transmitting a frame comprising the information element.

Example 32 includes the subject matter of Example 31, and optionally, wherein the operations comprise communicating a Multiple In Multiple Out (MIMO) communication via the plurality of directional antennas configured according to a plurality of polarization settings indicated by the plurality of polarization indicators.

Example 33 includes the subject matter of Example 32, and optionally, wherein the MIMO communication comprises a Multi User (MU) MIMO communication.

Example 34 includes the subject matter of Example 32, and optionally, wherein the MIMO communication comprises a single user (SU) MIMO communication.

Example 35 includes the subject matter of any one of Examples 32-34, and optionally, wherein the MIMO communication comprises a MIMO communication over a millimeter wave (mmWave) wireless communication band.

Example 36 includes the subject matter of any one of Examples 31-35, and optionally, wherein the information element comprises a plurality of pairs of configuration fields, a pair of configuration fields corresponding to the directional antenna comprising an antenna identifier (ID) field and a polarization indication field, the antenna ID field comprising the antenna identifier, and the polarization indication field comprising the polarization indicator.

Example 37 includes the subject matter of Example 36, and optionally, wherein the information element comprises a field to indicate a number of the plurality of pairs of configuration fields.

Example 38 includes the subject matter of any one of Examples 31-37, and optionally, wherein the polarization setting comprises a setting selected from a group consisting of a vertically polarized setting, a horizontally polarized setting, a left-hand circularly polarized (LHCP) setting, and a right-hand circularly polarized (RHCP) setting.

Example 39 includes the subject matter of any one of Examples 31-38, and optionally, wherein at least two antenna identifiers of the plurality of antenna identifiers identify two different directional antennas of the wireless station, the plurality of polarization indicators comprise at least two different polarization indicators to indicate at least two respective different polarization settings of the at least two different directional antennas.

Example 40 includes the subject matter of Example 39, and optionally, wherein the operations comprise communicating a MIMO communication via the at least two different directional antennas according to the at least two different polarization settings.

Example 41 includes the subject matter of any one of Examples 31-40, and optionally, wherein at least two antenna identifiers of the plurality of antenna identifiers identify the same directional antenna, the plurality of polarization indicators comprise at least two different polarization indicators to indicate at least two respective different polarization settings of the same directional antenna.

Example 42 includes the subject matter of Example 41, and optionally, wherein the two different polarization settings are to be sequentially applied to the same directional antenna.

Example 43 includes the subject matter of Example 41, and optionally, wherein the same directional antenna comprises a dual polarization antenna, the two different polarization settings are to be simultaneously applied to the dual polarization antenna.

Example 44 includes the subject matter of any one of Examples 31-43, and optionally, wherein the wireless station is a Directional Multi-Gigabit (DMG) Station (STA).

Example 45 includes an apparatus of wireless communication by a wireless station, the apparatus comprising means for generating an information element comprising a plurality of antenna identifiers of a plurality of directional antennas of the wireless station, and a plurality of polarization indicators corresponding to the plurality of antenna identifiers, a polarization indicator corresponding to an antenna identifier to indicate a polarization setting of a directional antenna identified by the antenna identifier; and means for transmitting a frame comprising the information element.

Example 46 includes the subject matter of Example 45, and optionally, comprising means for communicating a Multiple In Multiple Out (MIMO) communication via the plurality of directional antennas configured according to a plurality of polarization settings indicated by the plurality of polarization indicators.

Example 47 includes the subject matter of Example 46, and optionally, wherein the MIMO communication comprises a Multi User (MU) MIMO communication.

Example 48 includes the subject matter of Example 46, and optionally, wherein the MIMO communication comprises a single user (SU) MIMO communication.

Example 49 includes the subject matter of any one of Examples 46-48, and optionally, wherein the MIMO communication comprises a MIMO communication over a millimeter wave (mmWave) wireless communication band.

Example 50 includes the subject matter of any one of Examples 45-49, and optionally, wherein the information element comprises a plurality of pairs of configuration fields, a pair of configuration fields corresponding to the directional antenna comprising an antenna identifier (ID) field and a polarization indication field, the antenna ID field comprising the antenna identifier, and the polarization indication field comprising the polarization indicator.

Example 51 includes the subject matter of Example 50, and optionally, wherein the information element comprises a field to indicate a number of the plurality of pairs of configuration fields.

Example 52 includes the subject matter of any one of Examples 45-51, and optionally, wherein the polarization setting comprises a setting selected from a group consisting of a vertically polarized setting, a horizontally polarized setting, a left-hand circularly polarized (LHCP) setting, and a right-hand circularly polarized (RHCP) setting.

Example 53 includes the subject matter of any one of Examples 45-52, and optionally, wherein at least two antenna identifiers of the plurality of antenna identifiers identify two different directional antennas of the wireless station, the plurality of polarization indicators comprise at least two different polarization indicators to indicate at least two respective different polarization settings of the at least two different directional antennas.

Example 54 includes the subject matter of Example 53, and optionally, comprising means for communicating a MIMO communication via the at least two different directional antennas according to the at least two different polarization settings.

Example 55 includes the subject matter of any one of Examples 45-54, and optionally, wherein at least two antenna identifiers of the plurality of antenna identifiers identify the same directional antenna, the plurality of polarization indicators comprise at least two different polarization indicators to indicate at least two respective different polarization settings of the same directional antenna.

Example 56 includes the subject matter of Example 55, and optionally, wherein the two different polarization settings are to be sequentially applied to the same directional antenna.

Example 57 includes the subject matter of Example 55, and optionally, wherein the same directional antenna comprises a dual polarization antenna, the two different polarization settings are to be simultaneously applied to the dual polarization antenna.

Example 58 includes the subject matter of any one of Examples 45-57, and optionally, wherein the wireless station is a Directional Multi-Gigabit (DMG) Station (STA).

Example 59 includes a system of wireless communication comprising a wireless station, the wireless station comprising a plurality of directional antennas; a memory; a processor; and a radio configured to transmit a frame comprising an information element comprising a plurality of antenna identifiers of the plurality of directional antennas, and a plurality of polarization indicators corresponding to the plurality of antenna identifiers, a polarization indicator corresponding to an antenna identifier to indicate a polarization setting of a directional antenna identified by the antenna identifier.

Example 60 includes the subject matter of Example 59, and optionally, wherein the radio is configured to communicate a Multiple In Multiple Out (MIMO) communication via the plurality of directional antennas configured according to a plurality of polarization settings indicated by the plurality of polarization indicators.

Example 61 includes the subject matter of Example 60, and optionally, wherein the MIMO communication comprises a Multi User (MU) MIMO communication.

Example 62 includes the subject matter of Example 60, and optionally, wherein the MIMO communication comprises a single user (SU) MIMO communication.

Example 63 includes the subject matter of any one of Examples 60-62, and optionally, wherein the MIMO communication comprises a MIMO communication over a millimeter wave (mmWave) wireless communication band.

Example 64 includes the subject matter of any one of Examples 59-63, and optionally, wherein the information element comprises a plurality of pairs of configuration fields, a pair of configuration fields corresponding to the directional antenna comprising an antenna identifier (ID) field and a polarization indication field, the antenna ID field comprising the antenna identifier, and the polarization indication field comprising the polarization indicator.

Example 65 includes the subject matter of Example 64, and optionally, wherein the information element comprises a field to indicate a number of the plurality of pairs of configuration fields.

Example 66 includes the subject matter of any one of Examples 59-65, and optionally, wherein the polarization setting comprises a setting selected from a group consisting of a vertically polarized setting, a horizontally polarized setting, a left-hand circularly polarized (LHCP) setting, and a right-hand circularly polarized (RHCP) setting.

Example 67 includes the subject matter of any one of Examples 59-66, and optionally, wherein at least two antenna identifiers of the plurality of antenna identifiers identify two different directional antennas of the wireless station, the plurality of polarization indicators comprise at least two different polarization indicators to indicate at least two respective different polarization settings of the at least two different directional antennas.

Example 68 includes the subject matter of Example 67, and optionally, wherein the radio is configured to communicate a MIMO communication via the at least two different directional antennas according to the at least two different polarization settings.

Example 69 includes the subject matter of any one of Examples 59-68, and optionally, wherein at least two antenna identifiers of the plurality of antenna identifiers identify the same directional antenna, the plurality of polarization indicators comprise at least two different polarization indicators to indicate at least two respective different polarization settings of the same directional antenna.

Example 70 includes the subject matter of Example 69, and optionally, wherein the two different polarization settings are to be sequentially applied to the same directional antenna.

Example 71 includes the subject matter of Example 69, and optionally, wherein the same directional antenna comprises a dual polarization antenna, the two different polarization settings are to be simultaneously applied to the dual polarization antenna.

Example 72 includes the subject matter of any one of Examples 59-71, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising memory circuitry, and one or more processors coupled to the memory circuitry, the apparatus configured to be part of a first wireless device including a plurality of Directional Multi-Gigabit (DMG) antennas, the memory to store logic and the one or more processors to execute the logic to:

generate an information element comprising a plurality of polarization capabilities fields, each polarization capabilities field of the plurality of polarization capabilities fields indicating a polarization capability of a corresponding DMG antenna of the plurality of DMG antennas, the information element further including a Number of DMG Antennas field to indicate a number of the DMG antennas, the Number of DMG Antennas field to precede the plurality polarization capabilities fields;

cause transmission of the information element to a second wireless device over an Extended Directional Multi-Gigabit (EDMG) wireless network;

determine polarization settings for the DMG antennas for wireless communication with the second wireless device based in part on the information element; and cause wireless communication with the second wireless device using the polarization settings.

2. The apparatus of claim 1, wherein the Number of DMG Antennas field indicates a number of the polarization capabilities fields.

3. The apparatus of claim 1, wherein said each polarization capabilities field indicates, for said DMG antenna of the plurality of DMG antennas, at least one of a single polarization capability, and a capability to switch between two different polarizations.

4. The apparatus of claim 1, further including a radio and the plurality of DMG antennas coupled to the radio.

5. The apparatus of claim 4, wherein the DMG antennas include at least one of a single polarization antenna, a dual polarization antenna and an antenna configured to switch between two different polarizations.

6. The apparatus of claim 1, wherein the one or more processors are to:

determine polarization settings for the DMG antennas for wireless communication with the second wireless device and with other wireless devices based in part on the information element; and cause Multi-User (MU) Multiple-Input Multiple Output (MIMO) wireless communication with the second wireless device and with the other wireless devices using the polarization settings.

7. The apparatus of claim 1, wherein the one or more processors are to cause Single-User (SU) Multiple-Input Multiple Output (MIMO) wireless communication with the second wireless device using the polarization settings.

8. The apparatus of claim 1, wherein said each polarization capabilities field indicates at least one of a linear polarization capability or a circular polarization capability for said DMG antenna of the plurality of DMG antennas.

9. The apparatus of claim 4, further including an input unit, an output unit, and a memory unit, and a processor coupled to the memory unit, to the input unit and to the output unit, the processor configured to perform instructions of an Operating System (OS).

10. A product comprising one or more tangible computer-readable non-transitory storage media comprising computer-executable instructions operable to, when executed by at least one computer processor, cause the at least one computer processor to implement one or more operations at a first wireless device, the one or more operations comprising:

generating an information element comprising a plurality of polarization capabilities fields, each polarization capabilities field of the plurality of polarization capabilities fields indicating a polarization capability of a corresponding directional antenna of a plurality of directional antennas of the first wireless device, the information element further including a Number of Directional Antennas field to indicate a number of the directional antennas, the Number of Directional Antennas field to precede the plurality polarization capabilities fields;

causing transmission of the information element from the first wireless device to a second wireless device over a millimeter-wave wireless network;

determining polarization settings for the directional antennas for wireless communication with the second wireless device based in part on the information element; and causing wireless communication with the second wireless device using the polarization settings.

11. The product of claim 10, wherein the Number of Directional Antennas field indicates a number of the polarization capabilities fields.

12. The product of claim 10, wherein said each polarization capabilities field indicates, for said directional antenna of the plurality of directional antennas, at least one of a single polarization capability, and a capability to switch between two different polarizations.

13. The product of claim 10, wherein the one or more operations further comprise:

determining polarization settings for the directional antennas for wireless communication with the second wireless device and with other wireless devices based in part on the information element; and causing Multi-User (MU) Multiple-Input Multiple Output (MIMO) wireless communication with the second wireless device and with the other wireless devices using the polarization settings.

14. The product of claim 10, wherein the one or more operations further comprise causing Single-User (SU) Multiple-Input Multiple Output (MIMO) wireless communication with the second wireless device using the polarization settings.

15. The product of claim 10, wherein said each polarization capabilities field indicates at least one of a linear polarization capability or a circular polarization capability for said directional antenna of the plurality of directional antennas.

16. A method to be performed at a first wireless device, the method comprising:

generating an information element comprising a plurality of polarization capabilities fields, each polarization capabilities field of the plurality of polarization capabilities fields indicating a polarization capability of a corresponding DMG antenna of a plurality of DMG antennas of the first wireless device, wherein the information element further includes a Number of DMG Antennas field to indicate a number of the DMG antennas, the Number of DMG Antennas field to precede the plurality polarization capabilities fields;

causing transmission of the information element from the first wireless device to a second wireless device over an Extended Directional Multi-Gigabit (EDMG) wireless network;

determining polarization settings for the DMG antennas for wireless communication with the second wireless device based in part on the information element; and causing wireless communication with the second wireless device using the polarization settings.

17. The method of claim 16, wherein the Number of DMG Antennas field indicates a number of the polarization capabilities fields.

18. The method of claim 16, wherein said each polarization capabilities field indicates, for said DMG antenna of the plurality of DMG antennas, at least one of a single polarization capability, and a capability to switch between two different polarizations.

19. The method of claim 16, the method further including:
   determining polarization settings for the DMG antennas for wireless communication with the second wireless device and with other wireless devices based in part on the information element; and
   causing Multi-User (MU) Multiple-Input Multiple Output (MIMO) wireless communication with the second wireless device and with the other wireless devices using the polarization settings.

20. The method of claim 16, wherein the one or more operations further comprise causing Single-User (SU) Multiple-Input Multiple Output (MIMO) wireless communication with the second wireless device using the polarization settings.

21. The method of claim 16, wherein said each polarization capabilities field indicates at least one of a linear polarization capability or a circular polarization capability for said DMG antenna of the plurality of DMG antennas.

* * * * *